US012597098B2

(12) United States Patent
Yang et al.

(10) Patent No.: US 12,597,098 B2
(45) Date of Patent: Apr. 7, 2026

(54) IMAGE ENHANCEMENT METHOD, CHIP AND IMAGE ACQUISITION DEVICE

(71) Applicants: INTELLINDUST INFORMATION TECHNOLOGY (SHENZHEN) CO., LTD, Shenzhen (CN); BEIJING INTELLINDUST INFORMATION TECHNOLOGY CO., LTD, Beijing (CN)

(72) Inventors: Zaichu Yang, Beijing (CN); Caizhi Zhu, Shenzhen (CN); Shengning Xiang, Shenzhen (CN); Lin Wang, Shenzhen (CN)

(73) Assignees: INTELLINDUST INFORMATION TECHNOLOGY (SHENZHEN) CO., LTD, Shenzhen (CN); BEIJING INTELLINDUST INFORMATION TECHNOLOGY CO., LTD, Beijing (CN)

( * ) Notice: Subject to any disclaimer, the term of this patent is extended or adjusted under 35 U.S.C. 154(b) by 364 days.

(21) Appl. No.: 18/240,128

(22) Filed: Aug. 30, 2023

(65) Prior Publication Data

US 2024/0135497 A1    Apr. 25, 2024
US 2024/0233084 A9    Jul. 11, 2024

(30) Foreign Application Priority Data

Oct. 21, 2022    (CN) ......................... 202211295291.2

(51) Int. Cl.
*G06T 5/50*        (2006.01)
*G06T 5/70*        (2024.01)

(52) U.S. Cl.
CPC .................. *G06T 5/50* (2013.01); *G06T 5/70* (2024.01); *G06T 2200/28* (2013.01); *G06T 2207/20084* (2013.01); *G06T 2207/20221* (2013.01)

(58) Field of Classification Search
None
See application file for complete search history.

(56) References Cited

FOREIGN PATENT DOCUMENTS

WO    WO-2021093468 A1 *    5/2021    ........... G06F 18/253
WO    WO-2022148446 A1 *    7/2022    ............. H04N 19/91

* cited by examiner

*Primary Examiner* — David Ometz
(74) *Attorney, Agent, or Firm* — Daniel F. Nesbitt; Nesbitt IP LLC

(57) ABSTRACT

Embodiments of the present application provide an image enhancement method, a chip, and an image acquisition device. The method comprises: storing, by a main processor, a preset number of Raw image frames to be processed currently acquired from a sensor in a first off-chip memory, into the on-chip memory; performing, by a first neural network processor, image fusion on a preset number of Raw image frames to be fused currently obtained based on the preset number of Raw image frames to be processed currently in the on-chip memory based on a preset image fusion network, to obtain a fused Raw image frame, and storing it into the on-chip memory; sending, by the main processor to an ISP chip, a target Raw image frame to be sent currently obtained based on the fused Raw image frame in the on-chip memory. Based on the above processing, image fusion can be performed on the Raw image frames sent by the sensor, during which noise in the Raw image frames can be removed, thereby improving the image quality of the sRGB image frames obtained by the ISP chip.

18 Claims, 8 Drawing Sheets

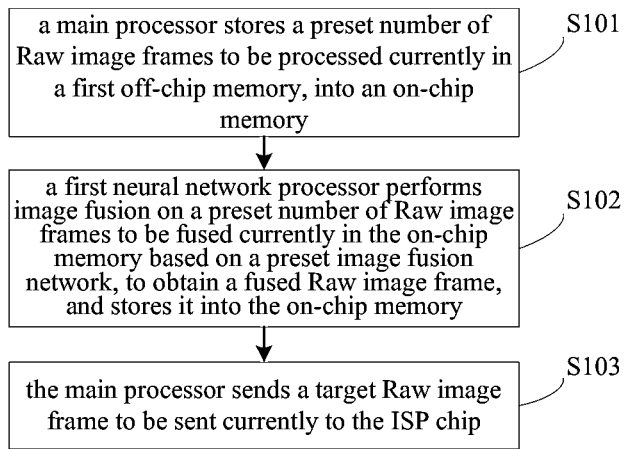

a main processor stores a preset number of Raw image frames to be processed currently in a first off-chip memory, into an on-chip memory — S101 a first neural network processor performs image fusion on a preset number of Raw image frames to be fused currently in the on-chip memory based on a preset image fusion network, to obtain a fused Raw image frame, and stores it into the on-chip memory — S102 the main processor sends a target Raw image frame to be sent currently to the ISP chip — S103

Fig. 1

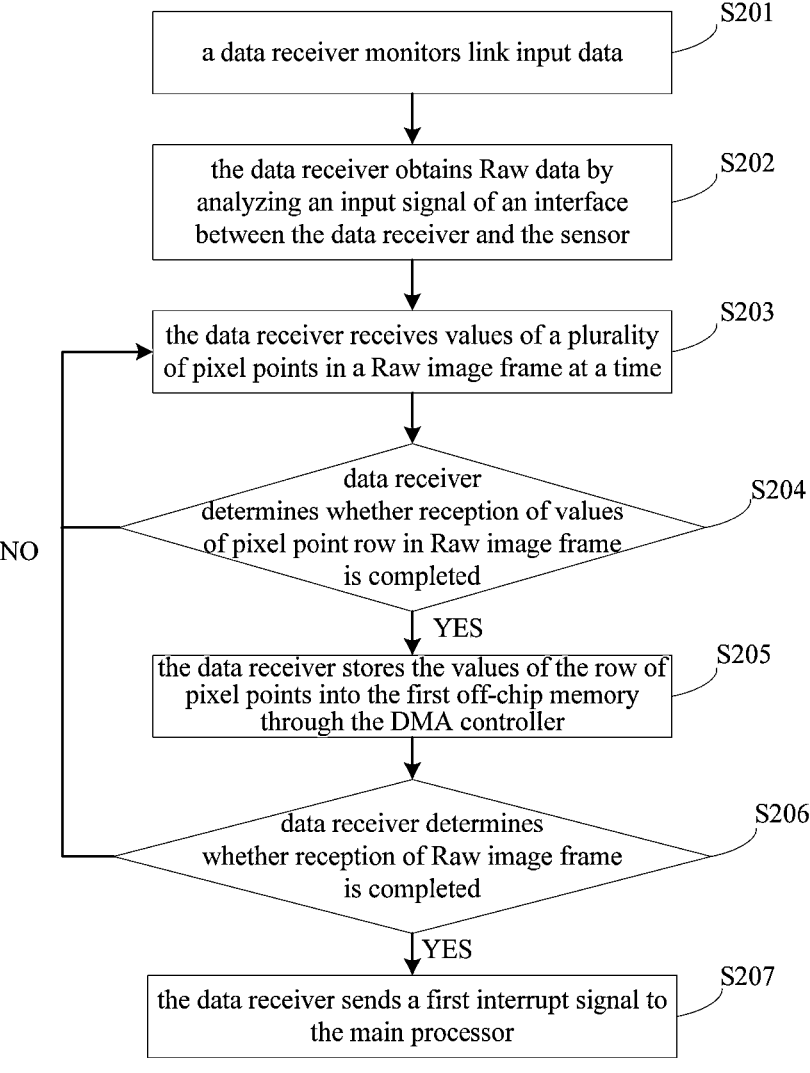

a data receiver monitors link input data — S201 the data receiver obtains Raw data by analyzing an input signal of an interface between the data receiver and the sensor — S202 the data receiver receives values of a plurality of pixel points in a Raw image frame at a time — S203 data receiver determines whether reception of values of pixel point row in Raw image frame is completed — S204

NO

YES the data receiver stores the values of the row of pixel points into the first off-chip memory through the DMA controller — S205 data receiver determines whether reception of Raw image frame is completed — S206

YES the data receiver sends a first interrupt signal to the main processor — S207

Fig. 2

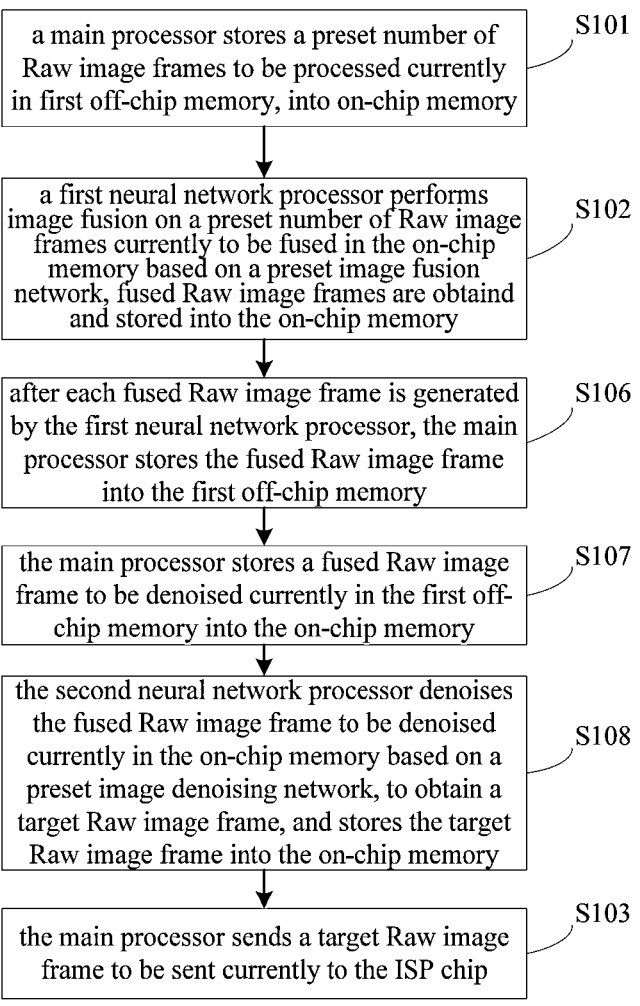

a main processor stores a preset number of
Raw image frames to be processed currently
in first off-chip memory, into on-chip memory       S101 a first neural network processor performs
image fusion on a preset number of Raw image
frames currently to be fused in the on-chip          S102
memory based on a preset image fusion
network, fused Raw image frames are obtaind
and stored into the on-chip memory after each fused Raw image frame is generated        S106
by the first neural network processor, the main
processor stores the fused Raw image frame
into the first off-chip memory the main processor stores a fused Raw image          S107
frame to be denoised currently in the first off-
chip memory into the on-chip memory the second neural network processor denoises
the fused Raw image frame to be denoised
currently in the on-chip memory based on a           S108
preset image denoising network, to obtain a
target Raw image frame, and stores the target
Raw image frame into the on-chip memory the main processor sends a target Raw image          S103
frame to be sent currently to the ISP chip

Fig. 4

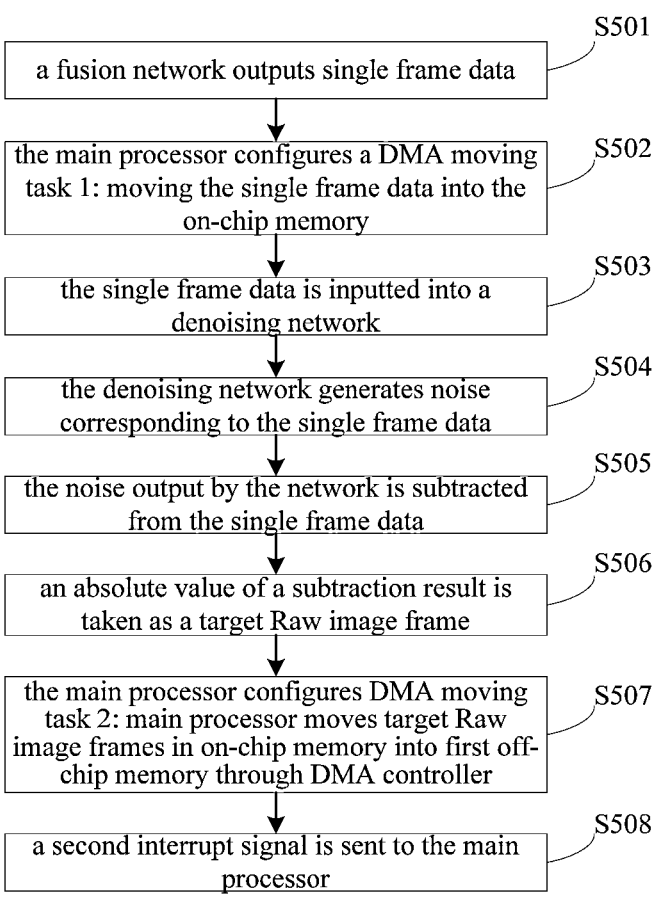

a fusion network outputs single frame data — S501 the main processor configures a DMA moving task 1: moving the single frame data into the on-chip memory — S502 the single frame data is inputted into a denoising network — S503 the denoising network generates noise corresponding to the single frame data — S504 the noise output by the network is subtracted from the single frame data — S505 an absolute value of a subtraction result is taken as a target Raw image frame — S506 the main processor configures DMA moving task 2: main processor moves target Raw image frames in on-chip memory into first off-chip memory through DMA controller — S507 a second interrupt signal is sent to the main processor — S508

Fig. 5

IMAGE ENHANCEMENT METHOD, CHIP AND IMAGE ACQUISITION DEVICE

TECHNICAL FIELD

The present application relates to the technical field of image processing, and in particular to an image enhancement method, a chip and an image acquisition device.

BACKGROUND

With the rapid development of computer technology, people use image information more and more widely, and the quality requirements for the images captured by image acquisition devices gradually increase.

An ISP (Image Signal Process) chip in an image acquisition device can recover Raw image frames input from a sensor into sRGB (standard Red Green Blue) image frames. However, the Raw image frames captured by the image acquisition device contain a lot of noise, which reduces the image quality of the sRGB image frames obtained by the ISP chip.

SUMMARY

The embodiments of the present application aim to provide an image enhancement method, a chip and an image acquisition device to improve the image quality of an sRGB image frame obtained by an ISP chip. The specific technical solution is as follows:

According to a first aspect of embodiments of the present application, an image enhancement method is provided, which is applied to an image enhancement chip comprising a main processor, a first neural network processor and an on-chip memory; wherein the method comprises:

storing, by the main processor, a preset number of Raw image frames to be processed currently in a first off-chip memory, into the on-chip memory; wherein the Raw image frames in the first off-chip memory are acquired from a sensor;

performing, by the first neural network processor, image fusion on a preset number of Raw image frames to be fused currently in the on-chip memory based on a preset image fusion network, to obtain a fused Raw image frame, and storing the fused Raw image frame into the on-chip memory; wherein the preset number of Raw image frames to be fused currently are obtained based on the preset number of Raw image frames to be processed currently;

sending, by the main processor to an ISP chip, a target Raw image frame to be sent currently; wherein the target Raw image frame is obtained based on the fused Raw image frame in the on-chip memory.

Optionally, before the first neural network processor performs the image fusion on the preset number of Raw image frames to be fused currently in the on-chip memory based on the preset image fusion network, to obtain the fused Raw image frame, and stores the fused Raw image frame into the on-chip memory, the method further comprises:

acquiring, by the main processor, a preset black frame image from a second off-chip memory and storing the preset black frame image into the on-chip memory;

pre-processing, by the main processor, the preset number of Raw image frames to be processed currently in the on-chip memory based on the preset black frame image in the on-chip memory respectively, to obtain the preset number of Raw image frames to be fused currently, and storing the preset number of Raw image frames to be fused currently into the on-chip memory.

Optionally, the first off-chip memory is a volatile memory, the second off-chip memory is a non-volatile memory, and the on-chip memory is a volatile memory.

Optionally, the image enhancement chip further comprises a second neural network processor;

before the target Raw image frame to be sent currently, stored in the on-chip memory, is sent by the main processor to the ISP chip, the method further comprises:

after each fused Raw image frame is generated by the first neural network processor, storing, by the main processor, the fused Raw image frame into the first off-chip memory;

storing, by the main processor, a fused Raw image frame to be denoised currently in the first off-chip memory into the on-chip memory;

denoising, by the second neural network processor, the fused Raw image frame to be denoised currently in the on-chip memory based on a preset image denoising network, to obtain the target Raw image frame, and storing the target Raw image frame into the on-chip memory.

Optionally, after the second neural network processor denoises the fused Raw image frame to be denoised currently in the on-chip memory based on the preset image denoising network, to obtain the target Raw image frame, and stores the target Raw image frame into the on-chip memory, the method further comprises:

after each target Raw image frame is generated by the second neural network processor, storing, by the main processor, the target Raw image frame into the first off-chip memory.

Optionally, the image enhancement chip further comprises a data transmitter;

sending, by the main processor to the ISP chip, the target Raw image frame to be sent currently, comprises:

storing, by the main processor, the target Raw image frame to be sent currently in the first off-chip memory into the on-chip memory;

sending, by the data transmitter in units of pixel row, the target Raw image frame to be sent currently in the on-chip memory to the ISP chip.

Optionally, the data transmitter is connected to the ISP chip via a mobile industry processor interface transmitter MIPI-TX;

sending, by the data transmitter in units of pixel row, the target Raw image frame to be sent currently in the on-chip memory to the ISP chip, comprises:

sending, by the data transmitter in units of pixel row, the target Raw image frame to be sent currently in the on-chip memory to the ISP chip via the MIPI-TX.

Optionally, before the main processor stores the Raw image frames acquired from the sensor into the first off-chip memory, the method further comprises:

acquiring, by the main processor, the preset image fusion network from the second off-chip memory and sending the preset image fusion network to the first neural network processor;

acquiring, by the main processor, the preset image denoising network from the second off-chip memory and sending the preset image denoising network to the second neural network processor.

Optionally, after the main processor acquires the preset image denoising network from the second off-chip memory and sends the preset image denoising network to the second neural network processor, the method further comprises:

acquiring, by the main processor from the second off-chip memory, a parameter file for an interface between the main processor and the sensor, and a parameter file for an interface between the main processor and the ISP chip;

configuring, by the main processor based on the acquired parameter files, the interface between the main processor and the sensor and the interface between the main processor and the ISP chip, respectively.

Optionally, storing, by the main processor, the preset number of Raw image frames to be processed currently in the first off-chip memory, into the on-chip memory, comprises:

determining, by the main processor, other Raw image frames than a first Raw image frame in a preset number of Raw image frames last stored into the on-chip memory in an order of reception of the Raw image frames;

determining, by the main processor, the other Raw image frames, and one Raw image frame following the other Raw image frames in the order of reception, as the preset number of Raw image frames to be processed currently, and storing them into the on-chip memory.

Optionally, the image enhancement chip further comprises a data receiver;

before the main processor stores the preset number of Raw image frames to be processed currently in the first off-chip memory, into the on-chip memory, the method further comprises:

receiving, by the data receiver in units of pixel row, the Raw image frames sent by the sensor and storing the Raw image frames sent by the sensor into the first off-chip memory.

Optionally, the data receiver is connected to the sensor via a mobile industry processor interface receiver MIPI-RX;

receiving, by the data receiver in units of pixel row, the Raw image frames sent by the sensor and storing the Raw image frames sent by the sensor into the first off-chip memory, comprises:

receiving, by the data receiver in units of pixel row, the Raw image frames sent by the sensor via the MIPI-RX and storing the Raw image frames into the first off-chip memory.

According to a second aspect of embodiments of the present application, an image enhancement chip is provided, which comprises a main processor, a first neural network processor and an on-chip memory; wherein:

the main processor is configured for storing a preset number of Raw image frames to be processed currently in a first off-chip memory, into the on-chip memory; wherein the Raw image frames in the first off-chip memory are acquired from a sensor;

the first neural network processor is configured for performing image fusion on a preset number of Raw image frames to be fused currently in the on-chip memory based on a preset image fusion network, to obtain a fused Raw image frame, and storing the fused Raw image frame into the on-chip memory; wherein the preset number of Raw image frames to be fused currently are obtained based on the preset number of Raw image frames to be processed currently;

the main processor is further configured for sending, to an ISP chip, a target Raw image frame to be sent currently; wherein the target Raw image frame is obtained based on the fused Raw image frame in the on-chip memory.

Optionally, the main processor is further configured for: before the first neural network processor performs the image fusion on the preset number of Raw image frames to be fused currently in the on-chip memory based on the preset image fusion network, to obtain the fused Raw image frame, and stores the fused Raw image frame into the on-chip memory, acquiring a preset black frame image from a second off-chip memory and storing the preset black frame image into the on-chip memory;

the main processor is further configured for pre-processing the preset number of Raw image frames to be processed currently in the on-chip memory based on the preset black frame image in the on-chip memory respectively, to obtain the preset number of Raw image frames to be fused currently, and storing the preset number of Raw image frames to be fused currently into the on-chip memory.

Optionally, the first off-chip memory is a volatile memory, the second off-chip memory is a non-volatile memory, and the on-chip memory is a volatile memory.

Optionally, the image enhancement chip further comprises a second neural network processor;

the main processor is further configured for: before the target Raw image frame to be sent currently, stored in the on-chip memory, is sent by the main processor to the ISP chip, after each fused Raw image frame is generated by the first neural network processor, storing the fused Raw image frame into the first off-chip memory;

the main processor is further configured for storing a fused Raw image frame to be denoised currently in the first off-chip memory into the on-chip memory;

the second neural network processor is configured for denoising the fused Raw image frame to be denoised currently in the on-chip memory based on a preset image denoising network, to obtain the target Raw image frame, and storing the target Raw image frame into the on-chip memory.

Optionally, the main processor is further configured for: after the second neural network processor denoises the fused Raw image frame to be denoised currently in the on-chip memory based on the preset image denoising network, to obtain the target Raw image frame, and stores the target Raw image frame into the on-chip memory, after each target Raw image frame is generated by the second neural network processor, storing the target Raw image frame into the first off-chip memory.

Optionally, the image enhancement chip further comprises a data transmitter;

the main processor is specifically configured for storing the target Raw image frame to be sent currently in the first off-chip memory into the on-chip memory;

the data transmitter is configured for sending, in units of pixel row, the target Raw image frame to be sent currently in the on-chip memory to the ISP chip.

Optionally, the data transmitter is connected to the ISP chip via a mobile industry processor interface transmitter MIPI-TX;

the data transmitter is specifically configured for sending, in units of pixel row, the target Raw image frame to be sent currently in the on-chip memory to the ISP chip via the MIPI-TX.

Optionally, the main processor is further configured for: before the main processor stores the Raw image frames acquired from the sensor into the first off-chip memory, acquiring the preset image fusion network from the second off-chip memory and sending the preset image fusion network to the first neural network processor;

the main processor is further configured for acquiring the preset image denoising network from the second off-chip memory and sending the preset image denoising network to the second neural network processor.

Optionally, the main processor is further configured for: after the main processor acquires the preset image denoising network from the second off-chip memory and sends the preset image denoising network to the second neural network processor, acquiring, from the second off-chip memory, a parameter file for an interface between the main processor and the sensor, and a parameter file for an interface between the main processor and the ISP chip;

the main processor is further configured for configuring, based on the acquired parameter files, the interface between the main processor and the sensor and the interface between the main processor and the ISP chip, respectively.

Optionally, the main processor is specifically configured for: determining other Raw image frames than a first Raw image frame in a preset number of Raw image frames last stored into the on-chip memory in an order of reception of the Raw image frames; determining the other Raw image frames, and one Raw image frame following the other Raw image frames in the order of reception, as the preset number of Raw image frames to be processed currently, and storing them into the on-chip memory.

Optionally, the image enhancement chip further comprises a data receiver;

the data receiver is configured for: before the main processor stores the preset number of Raw image frames to be processed currently in the first off-chip memory, into the on-chip memory, receiving, in units of pixel row, the Raw image frames sent by the sensor and storing the Raw image frames sent by the sensor into the first off-chip memory.

Optionally, the data receiver is connected to the sensor via a mobile industry processor interface receiver MIPI-RX;

the data receiver is specifically configured for receiving, in units of pixel row, the Raw image frames sent by the sensor via the MIPI-RX and storing the Raw image frames into the first off-chip memory.

Optionally, the image enhancement chip further comprises a peripheral interface for connection to a preset external device.

According to a third aspect of embodiments of the present application, an image acquisition device is provided, which comprises a sensor, an ISP chip, a first off-chip memory, a second off-chip memory, and the image enhancement chip as described in any one of the above;

wherein the sensor is configured for capturing the Raw image frames and sending the captured Raw image frames to the image enhancement chip;

the ISP chip is configured for acquiring the target Raw image frame from the image enhancement chip and generating a general color standard sRGB image frame corresponding to the acquired target Raw image frame.

In an image enhancement method provided by an embodiment of the present application, a main processor stores a preset number of Raw image frames to be processed currently in the first off-chip memory into the on-chip memory; wherein the Raw image frames in the first off-chip memory are acquired from a sensor; the first neural network processor performs image fusion on the preset number of Raw image frames to be fused currently in the on-chip memory based on a preset image fusion network, to obtain a fused Raw image frame, and stores the fused Raw image frame into the on-chip memory; wherein the preset number of Raw image frames to be fused currently are obtained based on the preset number of Raw image frames to be processed currently; the main processor sends a target Raw image frame to be sent currently to the ISP chip; wherein the target Raw image frame is obtained based on the fused Raw image frame in the on-chip memory. Based on the above processing, image fusion can be performed on the Raw image frames sent by the sensor, and during the fusion process, enhancement of the Raw image frames can be realized, the noise in the Raw image frames can be removed, thus the image quality of the Raw image frames received by the ISP chip can be improved, and the image quality of the sRGB image frames obtained by the ISP chip can be improved.

Of course, implementation of any of the products or methods of the present application does not necessarily require achieving all of the advantages described above at the same time.

BRIEF DESCRIPTION OF THE DRAWINGS

In order to more clearly illustrate the technical solutions in the embodiments of the present application or the prior art, the accompanying drawings to be used in the description of the embodiments or the prior art will be briefly introduced below. It will be obvious that the accompanying drawings in the following description are only some embodiments of the present application, and other embodiments can be obtained by those with ordinary skill in the art based on these drawings.

FIG. 1 shows a first flowchart of an image enhancement method provided by an embodiment of the present application;

FIG. 2 shows a flowchart of receiving Raw image frames in an image enhancement method provided by an embodiment of the present application;

FIG. 4 shows a third flowchart of an image enhancement method provided by an embodiment of the present application;

FIG. 5 shows a processing flowchart of image denoising in an image enhancement method provided by an embodiment of the present application;

DETAILED DESCRIPTION

Figure 3:
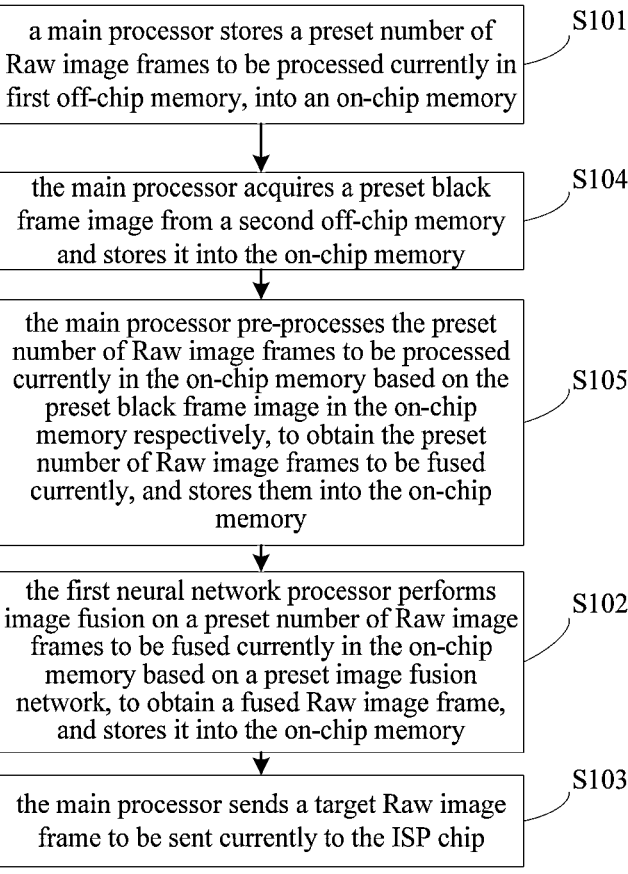
FIG. 3 shows a second flowchart of an image enhancement method provided by an embodiment of the present application.

The technical solutions in the embodiments of the present application will be described clearly and completely in the following in conjunction with the drawings in the embodiments of the present application, and it is clear that the described embodiments are only a part of the embodiments of the present application, but not all of them. Based on the embodiments in the present application, all other embodiments obtained by those with ordinary skill in the art based on the embodiments of the present application fall within the scope of protection of the present application.

In order to improve the image quality of sRGB image frames obtained by an ISP chip, embodiments of the present application provide an image enhancement method applied to an image enhancement chip, which may be a SOC (System On Chip) chip. The image enhancement chip includes a main processor, a first neural network processor, and an on-chip memory. Referring to FIG. 1, FIG. 1 shows a first flowchart of an image enhancement method provided by an embodiment of the present application, which may include the following steps:

Step S101: the main processor stores a preset number of Raw image frames to be processed currently in a first off-chip memory, into an on-chip memory.

Wherein the Raw image frames in the first off-chip memory are acquired from a sensor.

Step S102: the first neural network processor performs image fusion on a preset number of Raw image frames to be fused currently in the on-chip memory based on a preset image fusion network, to obtain a fused Raw image frame, and stores it into the on-chip memory.

Wherein the preset number of Raw image frames to be fused currently are obtained based on the preset number of Raw image frames to be processed currently.

Step S103: the main processor sends a target Raw image frame to be sent currently to the ISP chip.

Wherein the target Raw image frame is obtained based on the fused Raw image frame in the on-chip memory.

By adopting the image enhancement method provided by embodiments of the present application, image fusion can be performed on the Raw image frames sent by the sensor, and during the fusion process, enhancement of the Raw image frames can be realized, the noise in the Raw image frames can be removed, thus the image quality of the Raw image frames received by the ISP chip can be improved, and the image quality of the sRGB image frames obtained by the ISP chip can be improved. For a Raw image frame captured by the sensor under a dark light condition, the enhancement of the Raw image frame captured by the sensor under the dark light condition can be realized by removing the noise in the image frame based on the image fusion.

For step S101, the main processor may be a CPU (Central Processing Unit). The sensor converts the captured light source signals into the Raw image frames, and accordingly, the Raw image frames captured by the sensor may be stored into an off-chip memory (i.e., the first off-chip memory), so that the image enhancement chip can acquire the Raw image frames from the first off-chip memory and process them. By storing the Raw image frames sent by the sensor in the first off-chip memory, i.e., temporarily storing the Raw image frames to be processed in the first off-chip memory, the storage space of the on-chip memory can be saved, which in turn reduces the cost of the image enhancement chip.

In the present application, acquiring one Raw image frame from one memory (which can be referred to as a source memory) and storing it into another memory (which can be referred to as a destination memory) can also be referred to as moving the Raw image frame from the source memory to the destination memory.

In addition, in the present application, the main processor may implement the moving of the Raw image frames through a DMA (Direct Memory Access) controller. For example, in the following, the Raw image frame is moved from the first off-chip memory into the on-chip memory, a preset black frame image is moved from a second off-chip memory into the on-chip memory, the fused Raw image frame is moved into the first off-chip memory, a fused Raw image frame to be denoised currently in the first off-chip memory is moved into the on-chip memory, the target Raw image frame in the on-chip memory is moved into the first off-chip memory, a preset black frame image pre-stored in the second off-chip memory is moved into the first off-chip memory.

For example, the first off-chip memory may be a volatile memory, for example, DDR (DDR SDRAM, Double Data Rate Synchronous Dynamic Random Access Memory). The on-chip memory may be a volatile memory, for example, SRAM (Static Random Access Memory).

Since the image enhancement chip can perform image fusion on a preset number of consecutive Raw image frames, when the Raw image frames stored in the first off-chip memory satisfy a preset condition, the main processor can acquire a preset number of Raw image frames from the first off-chip memory, and can then perform subsequent processing on the preset number of Raw image frames. Wherein, satisfying the preset condition indicates that there are a preset number of Raw image frames in the first off-chip memory that require image fusion. The preset number may be adjusted according to actual situations without specific limitation, for example, the preset number may be 3, or the preset number may be 5. That is to say, whenever there are a preset number of Raw image frames that need to be fused in the first off-chip memory, the main processor can obtain the preset number of Raw image frames that need to be fused, that is, the preset number of Raw image frames to be processed currently, from the first off-chip memory.

In order to be able to fuse the preset number of Raw image frames to be processed, the main processor may store the preset number of Raw image frames to be processed into the on-chip memory, and then, based on step S102, the first neural network processor may perform the image fusion with the preset image fusion network based on the preset number of Raw image frames stored in the on-chip memory.

The image enhancement chip can be connected to the sensor via a MIPI interface, and then can receive Raw image frames from the sensor via the MIPI interface. In one embodiment, the image enhancement chip further comprises a data receiver. Before the main processor stores the preset number of Raw image frames to be processed currently in the first off-chip memory, into the on-chip memory (S101), the method further comprises:

the data receiver receives, in units of pixel row, Raw image frames sent by the sensor and stores them into the first off-chip memory.

In this embodiment, the sensor may send the captured Raw image frames to the data receiver, and accordingly, the data receiver stores the Raw image frames into the first off-chip memory, and then, the main processor may obtain the preset number of Raw image frames to be processed currently from the first off-chip memory.

In one implementation, the data receiver may include a MIPI D-PHY (Physical) module, which, in turn, may be connected to the sensor via a MIPI-RX (Mobile Industry Processor Interface Receiver) and perform data communications with the sensor based on a CSI (Camera Serial Interface) protocol with the sensor. In this way, the data receiver can receive, in units of pixel row, Raw image frames sent by the sensor via the MIPI-RX.

For example, data transmission between the data receiver and the sensor may be performed through a pair of source-synchronized differential clocks and four pairs of differential data lines. The sensor may generate differential signals corresponding to the Raw image frames and send them to the data receiver, and accordingly, the data receiver may convert the received differential signals into serial digital signals. In addition, the data receiver may determine a start position of the serial digital signal for each Raw image frame, frame synchronization of the serial digital signal is completed based on this start position, i.e., a complete serial digital signal for a Raw image frame can be determined. The data receiver may store the received Raw image frames into the first off-chip memory through a DMA controller by using an internal bus.

In the above process, for one Raw image frame, the sensor may send, in units of pixel row, the Raw image frame to the image enhancement chip, i.e., send values of one row of pixel points in the Raw image frame each time until values of the last row of pixel points in the Raw image frame are sent. Accordingly, the data receiver receives, in units of pixel row, the Raw image frame sent by the sensor.

In addition, when the data receiver completes the storage of one Raw image frame, it may send to the main processor an interrupt signal (which may be referred to as a first interrupt signal) indicating the completion of the reception, and accordingly, after the main processor receives the first interrupt signal, it may determine that a new Raw image frame has been stored in the first off-chip memory, and then, when it determines that the Raw image frames stored in the first off-chip memory satisfies a preset condition, a preset number of Raw image frames may be obtained from the first off-chip memory for processing.

Referring to FIG. 2, which shows a flowchart of receiving Raw image frames in an image enhancement method provided by an embodiment of the present application, comprising the following steps:

Step S201: the data receiver monitors link input data, i.e., the data receiver monitors data transmitted in the link between the data receiver and the sensor.

Step S202: the data receiver obtains Raw data by analyzing an input signal of an interface between the data receiver and the sensor, i.e., the data receiver acquires the Raw image frame sent by the sensor via the interface.

Step S203: the data receiver receives values of a plurality of pixel points in one Raw image frame at a time.

Step S204: the data receiver determines whether the reception of the values of a row of pixel points in the Raw image frame is completed, if yes, step S205 is performed, if not, step S203 is performed.

Step S205: the data receiver stores the values of the row of pixel points into the first off-chip memory through the DMA controller.

Step S206: the data receiver determines whether the reception of the Raw image frame is completed, if yes, step S207 is performed, if not, step S203 is performed.

Step S207: the data receiver sends a first interrupt signal to the main processor.

For step S102, the first neural network processor may be an NPU (Neural-network Processing Unit).

A fusion weight for each Raw image frame to be fused currently may be determined based on a preset image fusion network. Further, based on the obtained fusion weights, a preset number of Raw image frames to be fused currently are fused to obtain a fused Raw image frame. For example, the image fusion is performed based on Formula (1).

$$RAW = \sum_{n=1}^{N} (raw(n) * weight(n)) \tag{1}$$

where RAW denotes the fused Raw image frame, raw(n) denotes each Raw image frame to be fused currently, N denotes a preset number, and weight(n) denotes the fusion weight of each Raw image frame to be fused currently. That is, for a pixel position, a weighted sum of the values of the pixel points corresponding to said pixel position in the preset number of Raw image frames may be calculated based on the fusion weights, the weighted sum is also the value of the pixel point at that pixel position in the fused Raw image frame.

For example, the preset image fusion network may be realized based on U-net.

Based on the above processing, network inference can be performed through preset image fusion to realize the image fusion of multiple Raw image frames, and it is also possible to realize trajectory compensation of moving objects in the Raw image frames to avoid the presence of ghosting artifacts in the fused Raw image frames, to improve the image quality of the fused Raw image frames, and further improve the image quality of sRGB image frames obtained by the ISP chip.

In one implementation, a preset number of Raw image frames to be fused currently in the on-chip memory may be a preset number of Raw image frames to be processed currently. That is, the image fusion can be performed directly on the preset number of Raw image frames to be processed currently.

In another implementation, a preset number of Raw image frames to be processed currently in the on-chip memory may also be pre-processed separately to obtain a preset number of Raw image frames to be fused currently. Accordingly, on the basis of FIG. 1, see FIG. 3, which shows a second flowchart of an image enhancement method provided by an embodiment of the present application. Before the first neural network processor performs the image fusion on the preset number of Raw image frames to be fused currently in the on-chip memory based on the preset image fusion network, to obtain a fused Raw image frame, and stores the fused Raw image frame into the on-chip memory (S102), the method further comprises:

Step S104: the main processor acquires a preset black frame image from a second off-chip memory and stores it into the on-chip memory.

Step S105: the main processor pre-processes the preset number of Raw image frames to be processed currently in the on-chip memory based on the preset black frame image in the on-chip memory respectively, to obtain the preset number of Raw image frames to be fused currently, and stores the preset number of Raw image frames to be fused currently into the on-chip memory.

In an embodiment of the present application, the preset black frame image may be a Raw image frame captured by the sensor in advance under no-light conditions. Optionally, the sensor may send the preset black frame image to the image enhancement chip, and accordingly, the preset black frame image may be stored in advance in the second off-chip memory. The preset black frame image has the same resolution as the Raw image frame captured by the sensor. When it is needed to utilize the preset black frame image for processing, the preset black frame image in the second off-chip memory may be stored into the on-chip memory. For example, during the initialization of the image enhancement chip, the preset black frame image in the second off-chip memory may be stored into the first off-chip memory, and then, when the preset black frame image needs to be utilized for processing, the preset black frame image in the first off-chip memory may be stored into the on-chip memory.

For example, the second off-chip memory may be a non-volatile memory, e.g., a Flash.

As shown in formula (2), for each Raw image frame to be processed currently, the preset black frame image is subtracted from the Raw image frame, and then the corresponding Raw image frame to be fused currently is obtained based on the absolute value of the subtraction result.

$$f=\text{abs}(\text{raw}(n)-\text{black}) \tag{2}$$

where f denotes the Raw image frame to be fused currently, raw(n) denotes the Raw image frame to be processed currently, black denotes the preset black frame image. It is to be understood that for each pixel point in the Raw image frame to be processed currently, a difference between a value of this pixel point and a value of a corresponding pixel point in the preset black frame image may be calculated, and an absolute value of the difference may be calculated, and then the corresponding Raw image frame to be fused may be obtained.

Based on the above processing, the black level and bad dot information in the Raw image frame related to the physical characteristics of the sensor can be effectively removed to improve the image quality of the Raw image frame to be fused currently, then improve the image quality of the fused Raw image frame and further improve the image quality of the sRGB image frame obtained by the ISP chip.

For step S103, after receiving the target Raw image frame, the ISP chip may process the target Raw image frame, including AEC (Automatic Exposure Control), AGC (Automatic Gain Control), AWB (Automatic White Balance), color correction, Lens Shading, Gamma correction, etc. to obtain the sRGB image frame.

In one implementation, each fused Raw image frame in the on-chip memory may be identified as a target Raw image frame. In this way, after each fused Raw image frame is generated by the first neural network processor, the main processor stores the fused Raw image frame into the first off-chip memory, and subsequently, the fused Raw image frame in the first off-chip memory may be stored in the on-chip memory as a target Raw image frame to be sent currently, and sent to the ISP chip. By storing the fused Raw image frames in the first off-chip memory, i.e., temporarily storing the fused Raw image frames to be processed in the first off-chip memory, the storage space of the on-chip memory can be saved, which in turn reduces the cost of the image enhancement chip.

In another implementation, based on FIG. 1, see FIG. 4, which shows a third flowchart of an image enhancement method provided by an embodiment of the present application. The image enhancement chip further includes a second neural network processor. Before the main processor sends the target Raw image frame to be sent currently to the ISP chip (S103), the method further comprises:

Step S106: after each fused Raw image frame is generated by the first neural network processor, the main processor stores the fused Raw image frame into the first off-chip memory.

Step S107: the main processor stores a fused Raw image frame to be denoised currently in the first off-chip memory into the on-chip memory.

Step S108: the second neural network processor denoises the fused Raw image frame to be denoised currently in the on-chip memory based on a preset image denoising network, to obtain a target Raw image frame, and stores the target Raw image frame into the on-chip memory.

Wherein the second neural network processor may be an NPU (Neural-network Processing Unit).

In an embodiment of the present application, after each fused Raw image frame is generated by the first neural network processor and stored in the on-chip memory, the main processor may store the fused Raw image frame into the first off-chip memory, and accordingly, the second neural network processor may denoise the fused Raw image frame in the first off-chip memory.

Based on the preset image denoising network, a noise estimation value of the fused Raw image frame to be denoised currently may be determined, and then the fused Raw image frame to be denoised currently may be denoised based on the noise estimation value. For example, the determined noise estimation value may be subtracted from the fused Raw image frame to be denoised currently, and the corresponding target Raw image frame is obtained based on the absolute value of the result of the subtraction, as shown in formula (3).

$$RAW=\text{abs}(\text{raw}-\text{noise}) \tag{3}$$

where RAW denotes the target Raw image frame, raw denotes the fused Raw image frame to be denoised currently, and noise denotes the noise estimation value of the fused Raw image frame to be denoised currently. It can be understood that for each pixel point of the fused Raw image frame to be denoised currently, a difference between the value of the pixel point and the noise estimation value can be calculated, and the absolute value of the difference can be calculated, and then the corresponding target Raw image frame can also be obtained.

Based on the above processing, the fused Raw image frame is further denoised based on the preset image denoising network, so as to further reduce the noise in the obtained target Raw image frame, which can then improve the image quality of the target Raw image frame received by the ISP chip and further improve the image quality of the sRGB image frame obtained based on the target Raw image frame.

For example, the above preset image denoising network may be obtained based on the U-net.

In one embodiment, see FIG. 5, which shows a processing flowchart of image denoising in an image enhancement method provided by an embodiment of the present application, comprising the following steps:

Step S501: the fusion network outputs single frame data, i.e., a first neural network processor performs image fusion based on the preset image fusion network on a preset number of Raw image frames to be fused currently in an on-chip memory to obtain a fused Raw image frame. After the first neural network processor generates each fused Raw image frame, a main processor stores the fused Raw image frame into a first off-chip memory.

Step S502: the main processor configures a DMA moving task 1: moving the single frame data into the on-chip memory, i.e., the main processor moves a fused Raw image frame to be denoised currently in the first off-chip memory into the on-chip memory through a DMA controller.

Step S503: the single frame data is inputted into a denoising network, i.e., a second neural network processor deployed with the preset image denoising network acquires the fused Raw image frame to be denoised currently.

Step S504: the denoising network generates noise corresponding to the single frame data, i.e., the second neural network processor calculates the noise estimation value of the fused Raw image frame to be denoised currently using the preset image denoising network.

Step S505: the noise output by the network is subtracted from the single frame data, i.e., the second neural network processor subtracts, from the fused Raw image frame to be denoised currently, its corresponding noise estimation value using the preset image denoising network.

Step S506: an absolute value of a subtraction result is taken as a target Raw image frame, i.e., the second neural network processor calculates an absolute value of the result of subtracting, from the fused Raw image frame to be denoised currently, its corresponding noise estimation value using the preset image denoising network, to obtain the target Raw image frame, and stores it into the on-chip memory.

Step S507: the main processor configures a DMA moving task 2: the main processor moves the target Raw image frames in the on-chip memory into the first off-chip memory through the DMA controller.

Step S508: a second interrupt signal is sent to the main processor. After the moving of the target Raw image frame is completed, an interrupt signal (which may be referred to as a second interrupt signal) indicating the completion of the moving is sent to the main processor.

In an embodiment, after the second neural network processor denoises the fused Raw image frames to be denoised currently in the on-chip memory based on the preset image denoising network, to obtain the target Raw image frame, and stores the target Raw image frame into the on-chip memory (S108), the method further comprises: after each target Raw image frame is generated by the second neural network processor, the main processor stores the target Raw image frame into the first off-chip memory.

Based on the above processing, after each target Raw image frame is generated by the second neural network processor, the main processor stores the target Raw image frame into the first off-chip memory, and accordingly, the target Raw image frames stored in the first off-chip memory can be sent to the ISP chip subsequently. By storing the target Raw image frames in the first off-chip memory, i.e., temporarily storing the target Raw image frames needed to be sent in the first off-chip memory, the storage space of the on-chip memory can be saved, which reduces the cost of the image enhancement chip.

Figure 6:
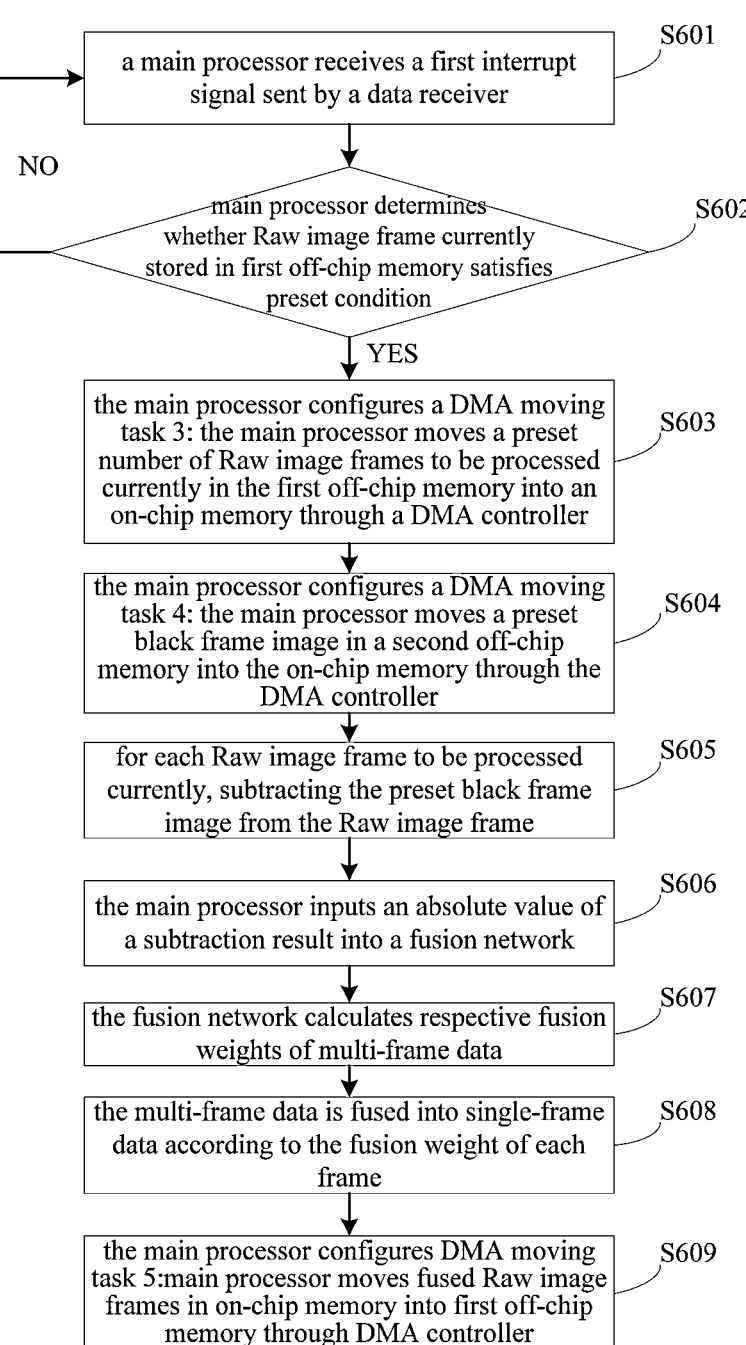
FIG. 6 shows a processing flowchart of image fusion in an image enhancement method provided by an embodiment of the present application.

Referring to FIG. 6, FIG. 6 shows a processing flowchart of image fusion in an image enhancement method provided by an embodiment of the present application, comprising the following steps:

Step S601: a main processor receives a first interrupt signal sent by a data receiver.

Step S602: the main processor determines whether a Raw image frame currently stored in a first off-chip memory satisfies a preset condition, if yes, step S603 is performed, if not, step S601 is performed.

Step S603: the main processor configures a DMA moving task 3: the main processor moves a preset number of Raw image frames to be processed currently in the first off-chip memory into an on-chip memory through a DMA controller.

Step S604: the main processor configures a DMA moving task 4: the main processor moves a preset black frame image in a second off-chip memory into the on-chip memory through the DMA controller.

Step S605: for each Raw image frame to be processed currently, subtracting the preset black frame image from the Raw image frame.

Step S606: the main processor inputs an absolute value of a subtraction result into a fusion network, i.e., the main processor calculates the absolute value of the subtraction result, to obtain the Raw image frame to be fused currently, and stores it into the on-chip memory.

Step S607: the fusion network calculates respective fusion weights of multi-frame data, i.e., the first neural network processor determines the fusion weight of each Raw image frame to be fused currently based on the preset image fusion network.

Step S608: the multi-frame data is fused into single-frame data according to the fusion weight of each frame, i.e., the first neural network processor performs the image fusion on a preset number of Raw image frames to be fused currently according to the respective fusion weights based on the preset image fusion network, to obtain a fused Raw image frame, and stores it into the on-chip memory.

Step S609: the main processor configures a DMA moving task 5: the main processor moves the fused Raw image frames in the on-chip memory into the first off-chip memory through the DMA controller.

The image enhancement chip may be connected to an ISP chip via a MIPI interface, and may also send the Raw image frames to the ISP chip via the MIPI interface. In one embodiment, the image enhancement chip further comprises a data transmitter. Step (S103) in which the main processor sends the target Raw image frame to be sent currently to the ISP chip, comprises:

storing, by the main processor, the target Raw image frame to be sent currently in the first off-chip memory into the on-chip memory;

sending, by the data transmitter in units of pixel row, the target Raw image frame to be sent currently in the on-chip memory to the ISP chip.

In this embodiment, the main processor obtains the target Raw image frame from the first off-chip memory and stores it into the on-chip memory, and accordingly, the data transmitter may send the target Raw image frame in the on-chip memory to the ISP chip, and then the ISP chip may process the target Raw image frame to obtain an sRGB image frame.

In one implementation, a data transmitter may include a MIPI D-PHY (Physical) module, which, in turn, may be connected to an ISP chip via a MIPI-TX (Mobile Industry Processor Interface Transmitter) and perform data communications with the ISP chip based on CSI protocols. Then, the data transmitter can send, in units of pixel row, target Raw image frames to be sent currently in the on-chip memory to the ISP chip via the MIPI-TX.

For example, the main processor may store the target Raw image frames in the first off-chip memory into the on-chip memory using an internal bus through the DMA controller. Data transmission between the data transmitter and the ISP chip is performed through one pair of source-synchronized differential clocks and four pairs of differential data lines. The data transmitter can perform serialization processing on the target Raw image frame in the on-chip memory by inserting frame synchronization information at a start position of the target Raw image frame, which can thus determine the start position of the target image frame, and then the target Raw image frame can be converted into a serial digital signal. In addition, the data transmitter may convert the serial digital signal corresponding to the target Raw image frame into a differential signal and send the differential signal corresponding to the target Raw image frame to the ISP chip.

In the above process, for one target Raw image frame, the data transmitter may send, in units of pixel row, the target Raw image frame to the ISP chip, i.e., send values of one row of pixel points in the target Raw image frame each time until values of the last row of pixel points in the target Raw image frame are sent. Accordingly, the ISP chip receives, in units of pixel row, the target Raw image frame sent by the data transmitter.

In addition, when the data transmitter completes the transmission of one target Raw image frame, it may send to the main processor an interrupt signal (which may be referred to as a third interrupt signal) indicating the completion of the transmission, and accordingly, after the main processor receives the third interrupt signal, it may determine that a new target Raw image frame has been sent to the ISP chip.

Figure 7:
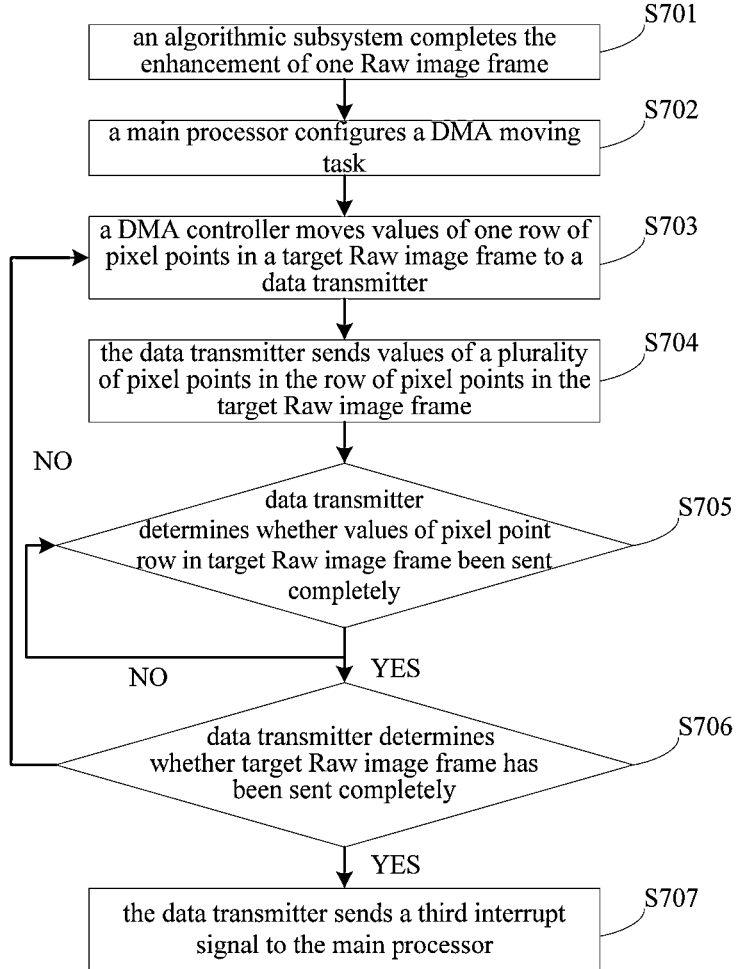
FIG. 7 shows a flowchart of sending target Raw image frames in an image enhancement method provided by an embodiment of the present application.

Referring to FIG. 7, FIG. 7 shows a flowchart of sending target Raw image frames in an image enhancement method provided by an embodiment of the present application, comprising the following steps:

Step S701: an algorithmic subsystem completes the enhancement of one Raw image frame. The algorithmic subsystem may include a first neural network processor and a second neural network processor. That is, a target Raw image frame is obtained through the first neural network processor and the second neural network processor.

Step S702: a main processor configures a DMA moving task.

Step S703: a DMA controller moves values of one row of pixel points in a target Raw image frame to a data transmitter.

Step S704: the data transmitter sends values of a plurality of pixel points in the row of pixel points in the target Raw image frame.

Step S705: the data transmitter determines whether the values of this row of pixel point in the target Raw image frame have been sent completely, if yes, step S706 is performed, if not, step S705 is performed.

Step S706: the data transmitter determines whether the target Raw image frame has been sent completely, if yes, step S707 is performed, if not, step S703 is performed.

Step S707: the data transmitter sends a third interrupt signal to the main processor.

In the present application, the first off-chip memory may store Raw image frames sent by the sensor (which may be referred to as original Raw image frames), fused Raw image frames, target Raw image frames generated during the processing by an image enhancement chip, as well as intermediate data during the processing by a preset image fusion network and a preset image denoising network.

In the embodiment of the present application, the cost of using the on-chip memory is higher compared to the off-chip memory. By storing the above data in the first off-chip memory, the storage space of the on-chip memory can be saved, thereby reducing the cost of the image enhancement chip.

The original Raw image received by the image enhancement chip may be stored in the first off-chip memory in a form of a queue, and accordingly, in accordance with the principle of first-in-first-out of the queue, the original Raw image may be acquired from the queue, and the acquired original Raw image is denoised based on a preset black frame image, and image fusion may be carried out on the denoised original Raw image to obtain a fused Raw image frame.

Accordingly, each generated fused Raw image frame may be stored in the first off-chip memory in the form of a queue, and accordingly, in accordance with the principle of first-in-first-out of the queue, the fused Raw image frames may be acquired from the queue, and may be denoised based on a preset image denoising network to obtain the target Raw image frames.

Accordingly, each generated target Raw image frame may also be stored in the first off-chip memory in the form of a queue. Accordingly, in accordance with the principle of first-in-first-out of the queue, the target Raw image frames may be acquired from the queue and stored into the on-chip memory so that the target Raw image frames in the on-chip memory can be sent to an ISP chip.

Figure 8:
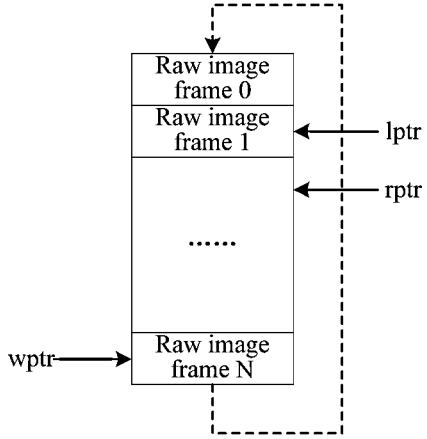
FIG. 8 shows a schematic diagram illustrating the principle of processing Raw image frames based on a first off-chip memory in an image enhancement method provided by an embodiment of the present application.

Referring to FIG. 8, FIG. 8 shows a schematic diagram illustrating the principle of processing Raw image frames based on a first off-chip memory in an image enhancement method provided by an embodiment of the present application.

In FIG. 8, a Raw image frame 0 to a Raw image frame N have been currently stored in a first off-chip memory, and according to the index value of a write pointer (wptr), acquired Raw image frames are stored in the first off-chip memory in the form of a queue, wherein the index value of the write pointer (wptr) points to the end of the queue. Correspondingly, the index value of a read pointer (rptr) points to the position of a currently read Raw image frame in the queue, and the Raw image frames in the queue can be read sequentially according to the index value of the read pointer (rptr). When a new Raw image frame is stored, the index value of the write pointer (wptr) can be updated. When a Raw image frame is read, the index value of the read pointer (rptr) can be updated. In addition, the index value of a release pointer (lptr) can be configured that points to a Raw image frame that currently needs to be released, i.e., when the read Raw image frame has been processed, i.e., when the Raw image frame is no longer needed, it can be released to update the index value of the release pointer (lptr).

In one embodiment, before the main processor stores a preset number of Raw image frames to be processed currently in the first off-chip memory, into the on-chip memory (S101), the method further comprises:

acquiring, by the main processor, the preset image fusion network from the second off-chip memory, and sending the preset image fusion network to the first neural network processor;

acquiring, by the main processor, the preset image denoising network from the second off-chip memory, and sending the preset image denoising network to the second neural network processor.

When an image enhancement chip is powered on, it can be configured for initialization, including the configurations of the preset image fusion network and the preset image denoising network. For example, network structures as well as network parameters of the preset image fusion network and the preset image denoising network may be stored in the second off-chip memory in advance. By storing the network structure as well as the network parameters of the preset image fusion network and the preset image denoising network in the second off-chip memory, i.e., by temporarily storing fused Raw image frames needed to be processed in the second off-chip memory, the storage space of the on-chip memory can be saved, which then reduces the cost of the image enhancement chip.

In an embodiment, after the main processor acquires a parameter file of the preset image denoising network from the second off-chip memory and sends the parameter file of the preset image denoising network to the second neural network processor, the method further comprises:

acquiring, by the main processor from the second off-chip memory, a parameter file for an interface between the main processor and the sensor, and a parameter file for an interface between the main processor and the ISP chip;

configuring, by the main processor based on the acquired parameter files, the interface between the main processor and the sensor and the interface between the main processor and the ISP chip, respectively.

After the configurations of the preset image fusion network and the preset image denoising network are completed, an interface between an image enhancement chip and the sensor, as well as an interface between the image enhancement chip and an ISP chip can also be configured. Further, after the configuration of the interface is completed, Raw image frames can be acquired from the sensor and processed, and target Raw image frames obtained by processing can be sent to the ISP chip. By storing the parameter file for the interface between the main processor and the sensor, as well as the parameter file for the interface between the main processor and the ISP chip in the second off-chip memory, i.e., temporarily storing the parameter file for the interface between the main processor and the sensor, as well as the parameter file for the interface between the main processor and the ISP chip in the second off-chip memory, the storage space of the on-chip memory can be saved, and the cost of the image enhancement chip can be reduced.

Figure 9:
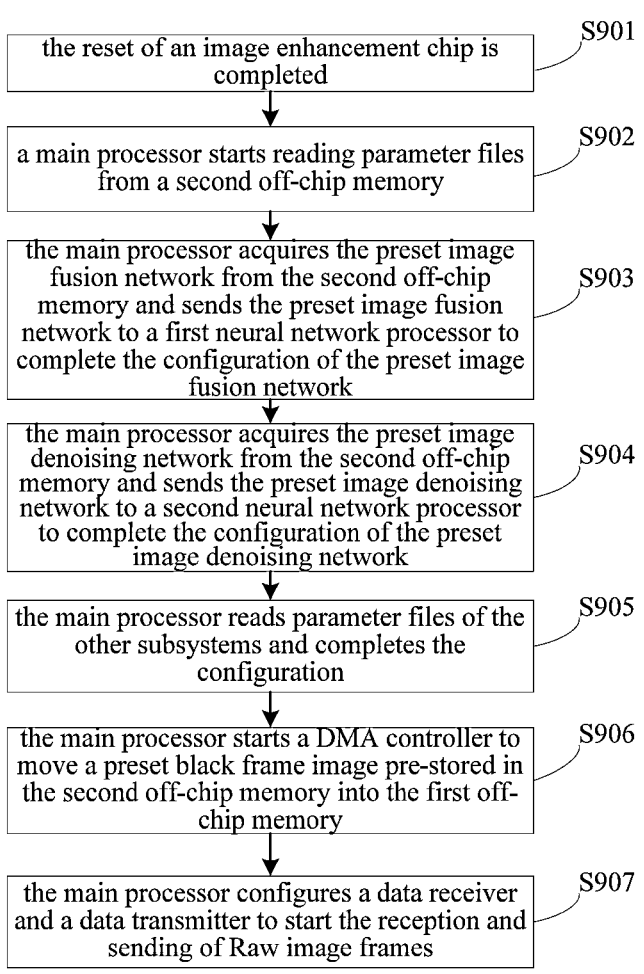
FIG. 9 shows a flowchart of an initialization configuration of an image enhancement method provided by an embodiment of the present application.

In one embodiment, see FIG. 9, which shows a flowchart of an initialization configuration of an image enhancement method provided by an embodiment of the present application, comprising the following steps:

Step S901: the reset of an image enhancement chip is completed.

Step S902: a main processor starts reading parameter files from a second off-chip memory. The parameter files include a preset image fusion network, a preset image denoising network, a parameter file for an interface between the main processor and a sensor, and a parameter file for an interface between the main processor and an ISP chip as described below.

Step S903: the main processor acquires the preset image fusion network from the second off-chip memory and sends the preset image fusion network to a first neural network processor to complete the configuration of the preset image fusion network.

Step S904: the main processor acquires the preset image denoising network from the second off-chip memory and sends the preset image denoising network to a second neural network processor to complete the configuration of the preset image denoising network.

Step S905: the main processor reads parameter files of the other subsystems and completes the configuration, i.e., the main processor acquires, from the second off-chip memory, a parameter file for the interface between the main processor and the sensor, and a parameter file for an interface between the main processor and the ISP chip, and configures the interface between the main processor and the sensor and the interface between the main processor and the ISP chip based on the acquired parameter files, respectively.

Step S906: the main processor starts a DMA controller to move a preset black frame image pre-stored in the second off-chip memory into the first off-chip memory.

Step S907: the main processor configures a data receiver and a data transmitter to start the reception and sending of Raw image frames.

In one embodiment, storing, by the main processor, the preset number of Raw image frames to be processed currently in the first off-chip memory, into the on-chip memory, comprises:

determining, by the main processor, other Raw image frames than a first Raw image frame in a preset number of Raw image frames last stored into the on-chip memory in an order of reception of the Raw image frames;

determining, by the main processor, the other Raw image frames, and one Raw image frame following the other Raw image frames in the order of reception, as the preset number of Raw image frames to be processed currently, and storing them into the on-chip memory.

In an embodiment of the present application, the main processor determines the other Raw image frames, and one Raw image frame following the other Raw image frames in the order of reception, as the preset number of Raw image frames to be processed currently, so that when the number of Raw image frames received from a sensor reaches the preset number, every time a new Raw image frame is received, image fusion processing can be performed on the new Raw image frame and a plurality of Raw image frames received before the new Raw image frame.

For example, when the preset number is 3, an image enhancement chip sequentially receives a Raw image frame 1, a Raw image frame 2, and, consequently, when a Raw image frame 3 is received, the image fusion processing can be performed on the Raw image frame 1, the Raw image frame 2, and the Raw image frame 3 to obtain a corresponding target Raw image frame. Subsequently, when a Raw image frame 4 is received, the image fusion processing may be performed on the Raw image frame 2, the Raw image frame 3, and the Raw image frame 4 to obtain a corresponding target Raw image frame. Subsequently, when a Raw image frame 5 is received, the image fusion processing may be performed on the Raw image frame 3, the Raw image frame 4, and the Raw image frame 5 to obtain a corresponding target Raw image frame, and so forth.

Based on the above processing, image fusion processing can be performed on each preset number of neighboring Raw image frames to obtain a corresponding target Raw image frame, which improves the image quality of the target Raw image frames, and then improves the image quality of the sRGB image frames obtained by the ISP chip.

Figure 10:
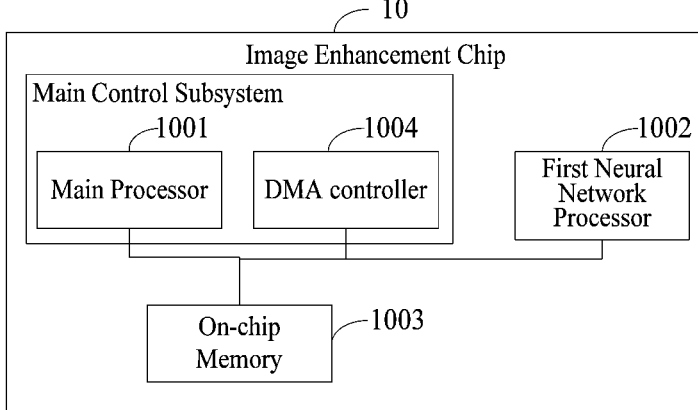
FIG. 10 shows a schematic structural diagram of an image enhancement chip provided by an embodiment of the present application.

Relative to the method embodiments described above, embodiments of the present application further provide an image enhancement chip. Referring to FIG. 10, FIG. 10 shows a schematic structural diagram of an image enhancement chip provided by an embodiment of the present application. The image enhancement chip 10 include a main processor 1001, a first neural network processor 1002, and an on-chip memory 1003. Wherein:

the main processor 1001 is configured for storing a preset number of Raw image frames to be processed currently in a first off-chip memory, into the on-chip memory 1003.

Wherein Raw image frames in the first off-chip memory are acquired from a sensor.

The first neural network processor 1002 is configured for performing image fusion on a preset number of Raw image frames to be fused currently in the on-chip memory 1003 based on a preset image fusion network, to obtain a fused Raw image frame, and storing it into the on-chip memory 1003.

Wherein the preset number of Raw image frames to be fused currently are obtained based on the preset number of Raw image frames to be processed currently.

The main processor 1001 is further configured for sending a target Raw image frame to be sent currently to an ISP chip.

Wherein the target Raw image frame is obtained based on the fused Raw image frame in the on-chip memory 1003.

The image enhancement chip provided by embodiments of the present application can perform image fusion on Raw image frames sent by the sensor, and during the fusion process, enhancement of the Raw image frames can be realized, the noise in the Raw image frames can be removed, thus the image quality of the Raw image frames received by the ISP chip can be improved, and the image quality of the sRGB image frames obtained by the ISP chip can be improved.

In one embodiment, see FIG. 10, the image enhancement chip 10 may also include a DMA controller 1004, i.e., a main control subsystem includes a main processor 1001 and the DMA controller 1004. Through the DMA controller 1004, data can be moved between multiple memories.

Figure 11:
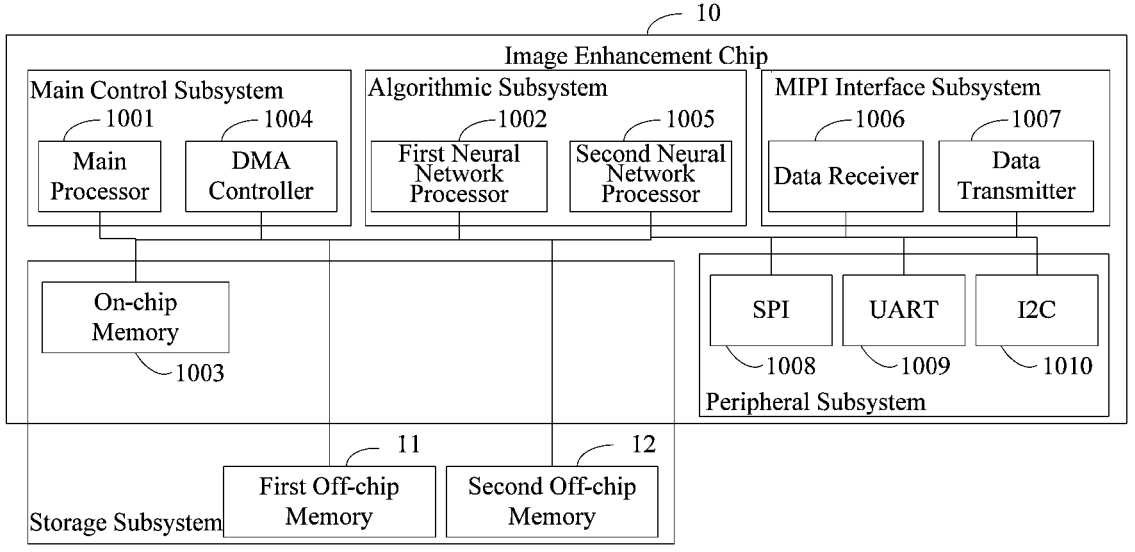
FIG. 11 shows another schematic structural diagram of an image enhancement chip provided by an embodiment of the present application.

In one embodiment, see FIG. 11, which illustrates another schematic structural diagram of an image enhancement chip provided by an embodiment of the present application. An image enhancement chip 10 may be connected to a first off-chip memory 11 and a second off-chip memory 12, and a storage subsystem includes an on-chip memory 1003, the first off-chip memory 11, and the second off-chip memory 12.

In one embodiment, see FIG. 11, a main processor 1001 is further configured for: before the first neural network processor 1002 performs image fusion on a preset number of Raw image frames to be fused currently in the on-chip memory 1003 based on a preset image fusion network, to obtain a fused Raw image frame, and stores it into the on-chip memory 1003, acquiring a preset black frame image from the second off-chip memory 12 and storing it into the on-chip memory 1003.

The main processor 1001 is further configured to pre-process the preset number of Raw image frames to be processed currently in the on-chip memory 1003 based on the preset black frame image in the on-chip memory 1003, respectively, to obtain the preset number of Raw image frames to be fused currently, and store them into the on-chip memory 1003.

In one embodiment, see FIG. 11, the first off-chip memory 11 is a volatile memory, the second off-chip memory 12 is a non-volatile memory, and the on-chip memory 1003 is a volatile memory.

In one embodiment, see FIG. 11, the image enhancement chip 10 further includes a second neural network processor 1005. An algorithmic subsystem includes a first neural network processor 1002 and a second neural network processor 1005.

The main processor 1001 is further configured for: before the target Raw image frame to be sent currently, stored in the on-chip memory 1003, is sent by the main processor 1001 to the ISP chip, after each fused Raw image frame is generated by the first neural network processor 1002, storing the fused Raw image frame into the first off-chip memory 11.

The main processor 1001 is further configured to store a fused Raw image frame to be denoised currently in the first off-chip memory 11 into the on-chip memory 1003.

The second neural network processor 1005 is configured for denoising the fused Raw image frame to be denoised currently in the on-chip memory 1003 based on a preset image denoising network, to obtain the target Raw image frame, and storing the target Raw image frame into the on-chip memory 1003.

In one embodiment, the main processor 1001 is further configured for: after the second neural network processor 1005 denoises the fused Raw image frame to be denoised currently in the on-chip memory 1003 based on the preset image denoising network, to obtain the target Raw image frame, and stores the target Raw image frame into the on-chip memory 1003, after each target Raw image frame is generated by the second neural network processor 1005, storing the target Raw image frame into the first off-chip memory 11.

In one embodiment, see FIG. 11, the image enhancement chip 10 further includes a data transmitter 1007.

The main processor 1001 is specifically configured for storing the target Raw image frame to be sent currently in the first off-chip memory 11 into the on-chip memory 1003.

The data transmitter 1007 is configured for sending, in units of pixel row, the target Raw image frame to be sent currently in the on-chip memory 1003 to the ISP chip.

In one embodiment, the data transmitter 1007 is connected to the ISP chip via a mobile industry processor interface transmitter MIPI-TX.

The data transmitter 1007 is specifically configured for sending, in units of pixel row, the target Raw image frame to be sent currently in the on-chip memory 1003 to the ISP chip via the MIPI-TX.

In one embodiment, the main processor 1001 is further configured for: before the main processor 1001 stores the Raw image frames acquired from the sensor into the first off-chip memory 11, acquiring the preset image fusion network from the second off-chip memory 12 and sending the preset image fusion network to the first neural network processor 1002.

The main processor 1001 is further configured to acquire the preset image denoising network from the second off-chip memory 12 and send the preset image denoising network to the second neural network processor 1005.

In one embodiment, see FIG. 11, the main processor 1001 is further configured for: after the main processor 1001 acquires the preset image denoising network from the second off-chip memory 12 and sends the preset image denoising network to the second neural network processor 1005, acquiring, from the second off-chip memory 12, a parameter file for an interface between the main processor and the sensor, and a parameter file for an interface between the main processor and the ISP chip.

The main processor 1001 is further configured for configuring, based on the acquired parameter files, the interface between the main processor and the sensor and the interface between the main processor and the ISP chip, respectively.

In one embodiment, referring to FIG. 11, the main processor 1001 is specifically configured for: determining other Raw image frames than a first Raw image frame in a preset number of Raw image frames last stored into the on-chip memory 1003 in an order of reception of the Raw image frames; determining the other Raw image frames, and one Raw image frame following the other Raw image frames in the order of reception, as the preset number of Raw image frames to be processed currently, and storing them into the on-chip memory 1003.

In one embodiment, see FIG. 11, the image enhancement chip 10 further includes a data receiver 1006. A MIPI interface subsystem includes the data receiver 1006 and a data transmitter 1007.

The data receiver 1006 is configured for: before the main processor 1011 stores the preset number of Raw image frames to be processed currently in the first off-chip memory 11, into the on-chip memory 1003, receiving, in units of pixel row, Raw image frames sent by the sensor and storing the Raw image frames sent by the sensor into the first off-chip memory 11.

In one embodiment, the data receiver 1006 is connected to the sensor via a mobile industry processor interface receiver MIPI-RX.

The data receiver 1006 is specifically configured for receiving, in units of pixel row, the Raw image frames sent by the sensor via the MIPI-RX and storing the Raw image frames into the first off-chip memory.

In one embodiment, see FIG. 11, the image enhancement chip 10 further includes a peripheral interface for connection to a preset external device. The peripheral interface includes an SPI (Serial Peripheral Interface) 1008, an UART (Universal Asynchronous Receiver/Transmitter) 1009, and an I2C (Inter-Integrated Circuit) 1010. That is, the peripheral subsystem in FIG. 11 contains respective peripheral interfaces.

In the embodiments of the present application, the image enhancement chip 10 supports commonly used peripheral interfaces which are not specifically limited. The peripheral interfaces may be configured for connection to an external device, for example, a debugging device and/or a display device. Connecting the debugging device can facilitate debugging the image enhancement chip, and connecting the display device can display the internal state of the image enhancement chip.

Figure 12:
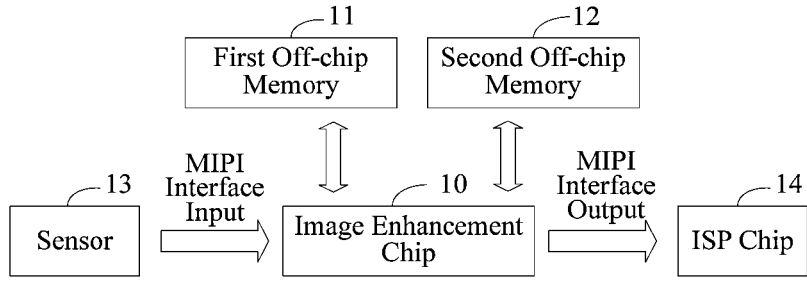
FIG. 12 shows a schematic structural diagram of an image acquisition device provided by an embodiment of the present application.

Embodiments of the present application also provide an image acquisition device, see FIG. 12, which is a schematic structural diagram of an image acquisition device provided by an embodiment of the present application. The image acquisition device includes a first off-chip memory 11, a second off-chip memory 12, a sensor 13, an ISP chip 14, and the image enhancement chip 10 as described in any one of the above.

The sensor 13 is configured for capturing Raw image frames and sending the captured Raw image frames to the image enhancement chip 10.

The ISP chip 14 is configured for acquiring a target Raw image frame from the image enhancement chip 10 and generating a general color standard sRGB image frame corresponding to the acquired target Raw image frame.

In an embodiment of the present application, the sensor 13 may input a Raw image frame to the image enhancement chip 10 via an MIPI interface, and the image enhancement chip 10 may output a target Raw image frame to the ISP chip 14 via the MIPI interface.

The image enhancement chip can receive and send the Raw image frames via the MIPI interface, and can be seamlessly embedded into an image acquisition device or an image processing device that support the MIPI interface, which improves the compatibility of the image enhancement chip, and also improves the application convenience of the image enhancement chip.

It is to be noted that, in this document, relational terms such as first and second are used only to distinguish one entity or operation from another entity or operation, and do not necessarily require or imply any actual relationship or order between these entities or operations. Furthermore, the terms "including", "comprising", or any other variant thereof are intended to cover non-exclusive inclusion, such that a process, method, article, or device comprising a series of elements includes not only those elements, but also other elements not expressly listed, or other elements that are not expressly listed for the purpose of such a process, method, article or apparatus, or other elements that are not expressly listed, or also includes elements that are inherent to such a process, method, article or device. Without further limitation, the elements defined by the statement "including one . . ." do not exclude the existence of other identical elements in the process, method, article, or device that includes the elements.

Each embodiment in this specification is described in a relevant manner, and the same and similar parts between each embodiment can be referred to each other, and each embodiment focuses on the differences from other embodiments. In particular, for the chip and image acquisition device embodiments, since they are basically similar to the method embodiments, the descriptions are relatively simple, and the partial explanation of the method embodiments can be referred to for relevant details.

The above is only preferred embodiments of the present application and are not intended to limit the scope of protection of the present application. Any modifications, equivalent replacements, improvements, etc. made within the spirit and principles of this application are included within the scope of protection of this application.

What is claimed is:

1. An image enhancement method, applied to an image enhancement chip comprising a main processor, a first neural network processor and an on-chip memory; wherein the method comprises:

storing, by the main processor, a preset number of Raw image frames to be processed currently in a first off-chip memory, into the on-chip memory; wherein the Raw image frames in the first off-chip memory are acquired from a sensor;

acquiring, by the main processor, a preset black frame image from a second off-chip memory and storing the preset black frame image into the on-chip memory;

pre-processing, by the main processor, the preset number of Raw image frames to be processed currently in the on-chip memory based on the preset black frame image in the on-chip memory, respectively, to obtain a preset number of Raw image frames to be fused currently, and storing the preset number of Raw image frames to be fused currently into the on-chip memory;

performing, by the first neural network processor, image fusion on the preset number of Raw image frames to be fused currently in the on-chip memory based on a preset image fusion network, to obtain a fused Raw image frame, and storing the fused Raw image frame into the on-chip memory; wherein the preset number of Raw image frames to be fused currently are obtained based on the preset number of Raw image frames to be processed currently; and sending, by the main processor to an image signal processor (ISP) chip, a target Raw image frame to be sent currently; wherein the target Raw image frame is obtained based on the fused Raw image frame in the on-chip memory.

2. The method according to claim 1, wherein the image enhancement chip further comprises a second neural network processor;

before the target Raw image frame to be sent currently, stored in the on-chip memory, is sent by the main processor to the ISP chip, the method further comprises:

after each fused Raw image frame is generated by the first neural network processor, storing, by the main processor, the fused Raw image frame into the first off-chip memory;

storing, by the main processor, a fused Raw image frame to be denoised currently in the first off-chip memory into the on-chip memory;

denoising, by the second neural network processor, the fused Raw image frame to be denoised currently in the on-chip memory based on a preset image denoising network, to obtain the target Raw image frame, and storing the target Raw image frame into the on-chip memory.

3. The method according to claim 2, wherein after the second neural network processor denoises the fused Raw image frame to be denoised currently in the on-chip memory based on the preset image denoising network, to obtain the target Raw image frame, and stores the target Raw image frame into the on-chip memory, the method further comprises:

after each target Raw image frame is generated by the second neural network processor, storing, by the main processor, the target Raw image frame into the first off-chip memory.

4. The method according to claim 3, wherein the image enhancement chip further comprises a data transmitter;

sending, by the main processor to the ISP chip, the target Raw image frame to be sent currently, comprises:

storing, by the main processor, the target Raw image frame to be sent currently in the first off-chip memory into the on-chip memory;

sending, by the data transmitter in units of pixel row, the target Raw image frame to be sent currently in the on-chip memory to the ISP chip.

5. The method according to claim 4, wherein the data transmitter is connected to the ISP chip via a mobile industry processor interface transmitter (MIPI-TX);

sending, by the data transmitter in units of pixel row, the target Raw image frame to be sent currently in the on-chip memory to the ISP chip, comprises:

sending, by the data transmitter in units of pixel row, the target Raw image frame to be sent currently in the on-chip memory to the ISP chip via the MIPI-TX.

6. The method according to claim 3, wherein before the main processor stores the Raw image frames acquired from the sensor into the first off-chip memory, the method further comprises:

acquiring, by the main processor, the preset image fusion network from the second off-chip memory and sending the preset image fusion network to the first neural network processor;

acquiring, by the main processor, the preset image denoising network from the second off-chip memory and sending the preset image denoising network to the second neural network processor.

7. The method according to claim 1, wherein storing, by the main processor, the preset number of Raw image frames to be processed currently in the first off-chip memory, into the on-chip memory, comprises:

determining, by the main processor, other Raw image frames than a first Raw image frame in a preset number of Raw image frames last stored into the on-chip memory in an order of reception of the Raw image frames;

determining, by the main processor, the other Raw image frames, and one Raw image frame following the other Raw image frames in the order of reception, as the preset number of Raw image frames to be processed currently, and storing them into the on-chip memory.

8. The method according to claim 1, wherein the image enhancement chip further comprises a data receiver;

before the main processor stores the preset number of Raw image frames to be processed currently in the first off-chip memory, into the on-chip memory, the method further comprises:

receiving, by the data receiver in units of pixel row, the Raw image frames sent by the sensor and storing the Raw image frames sent by the sensor into the first off-chip memory.

9. The method according to claim 8, wherein the data receiver is connected to the sensor via a mobile industry processor interface receiver (MIPI-RX);

receiving, by the data receiver in units of pixel row, the Raw image frames sent by the sensor and storing the Raw image frames sent by the sensor into the first off-chip memory, comprises:

receiving, by the data receiver in units of pixel row, the Raw image frames sent by the sensor via the MIPI-RX and storing the Raw image frames sent by the sensor into the first off-chip memory.

10. An image enhancement chip, comprising a main processor, a first neural network processor and an on-chip memory, wherein:

the main processor is configured for storing a preset number of Raw image frames to be processed currently in a first off-chip memory, into the on-chip memory; acquiring a preset black frame image from a second off-chip memory and storing the preset black frame image into the on-chip memory; and processing the preset number of Raw image frames to be processed currently in the on-chip memory based on the preset black frame image in the on-chip memory respectively, to obtain a preset number of Raw image frames to be fused currently, and storing the preset number of Raw image frames to be fused currently into the on-chip memory; wherein the Raw image frames in the first off-chip memory are acquired from a sensor;

the first neural network processor is configured for performing image fusion on the preset number of Raw image frames to be fused currently in the on-chip memory based on a preset image fusion network, to obtain a fused Raw image frame, and storing the fused Raw image frame into the on-chip memory; wherein the preset number of Raw image frames to be fused currently are obtained based on the preset number of Raw image frames to be processed currently;

the main processor is further configured for sending, to an image signal processor (ISP) chip, a target Raw image frame to be sent currently; wherein the target Raw image frame is obtained based on the fused Raw image frame in the on-chip memory.

11. The chip according to claim 10, wherein the image enhancement chip further comprises a second neural network processor;

the main processor is further configured for: before the target Raw image frame to be sent currently, stored in the on-chip memory, is sent by the main processor to the ISP chip, after each fused Raw image frame is generated by the first neural network processor, storing the fused Raw image frame into the first off-chip memory;

the main processor is further configured for storing a fused Raw image frame to be denoised currently in the first off-chip memory into the on-chip memory;

the second neural network processor is configured for denoising the fused Raw image frame to be denoised currently in the on-chip memory based on a preset image denoising network, to obtain the target Raw image frame, and storing the target Raw image frame into the on-chip memory.

12. The chip according to claim 11, wherein the main processor is further configured for: after the second neural network processor denoises the fused Raw image frame to be denoised currently in the on-chip memory based on the preset image denoising network, to obtain the target Raw image frame, and stores the target Raw image frame into the on-chip memory, after each target Raw image frame is generated by the second neural network processor, storing the target Raw image frame into the first off-chip memory.

13. The chip according to claim 12, wherein the image enhancement chip further comprises a data transmitter;

the main processor is specifically configured for storing the target Raw image frame to be sent currently in the first off-chip memory into the on-chip memory;

the data transmitter is configured for sending, in units of pixel row, the target Raw image frame to be sent currently in the on-chip memory to the ISP chip.

14. The chip according to claim 13, wherein the data transmitter is connected to the ISP chip via a mobile industry processor interface transmitter (MIPI-TX);

the data transmitter is specifically configured for sending, in units of pixel row, the target Raw image frame to be sent currently in the on-chip memory to the ISP chip via the MIPI-TX.

15. The chip according to claim 12, wherein the main processor is further configured for: before the main processor stores the Raw image frames acquired from the sensor into the first off-chip memory, acquiring the preset image fusion network from the second off-chip memory and sending the preset image fusion network to the first neural network processor;

the main processor is further configured for acquiring the preset image denoising network from the second off-chip memory and sending the preset image denoising network to the second neural network processor.

16. The chip according to claim 10, wherein the main processor is specifically configured for: determining other Raw image frames than a first Raw image frame in a preset number of Raw image frames last stored into the on-chip memory in an order of reception of the Raw image frames; determining the other Raw image frames and one Raw image frame following the other Raw image frames in the order of reception, as the preset number of Raw image frames to be processed currently, and storing them into the on-chip memory.

17. The chip according to claim 10, wherein the image enhancement chip further comprises a data receiver;

the data receiver is configured for: before the main processor stores the preset number of Raw image frames to be processed currently in the first off-chip memory, into the on-chip memory, receiving, in units of pixel row, the Raw image frames sent by the sensor and storing the Raw image frames sent by the sensor into the first off-chip memory;

wherein the data receiver is connected to the sensor via a mobile industry processor interface receiver (MIPI-RX);

the data receiver is specifically configured for receiving, in units of pixel row, the Raw image frames sent by the sensor via the MIPI-RX and storing the Raw image frames sent by the sensor into the first off-chip memory.

18. An image acquisition device, comprising a sensor, an image signal processor (ISP) chip, a first off-chip memory, a second off-chip memory, and the image enhancement chip as claimed in claim 10;

wherein the sensor is configured for capturing the Raw image frames and sending the captured Raw image frames to the image enhancement chip;

the ISP chip is configured for acquiring the target Raw image frame from the image enhancement chip and generating a general color standard Red Green Blue image frame corresponding to the acquired target Raw image frame.

* * * * *